Oct. 24, 1967  C. L. WILSON  3,348,852
AUTOMATIC CHUCK
Filed Jan. 27, 1965
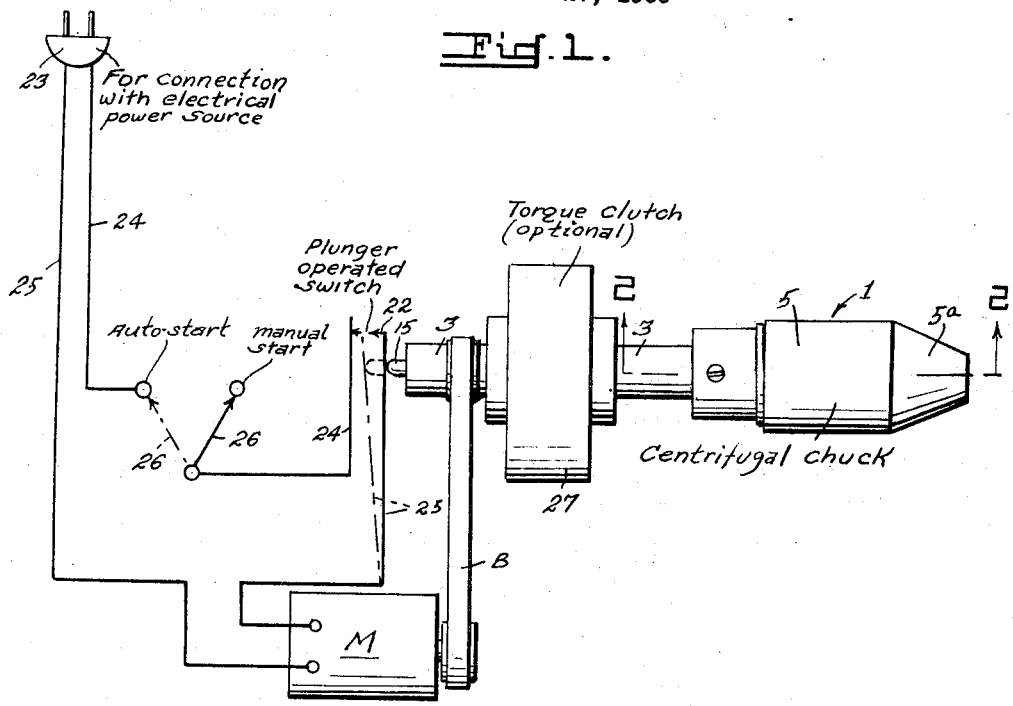
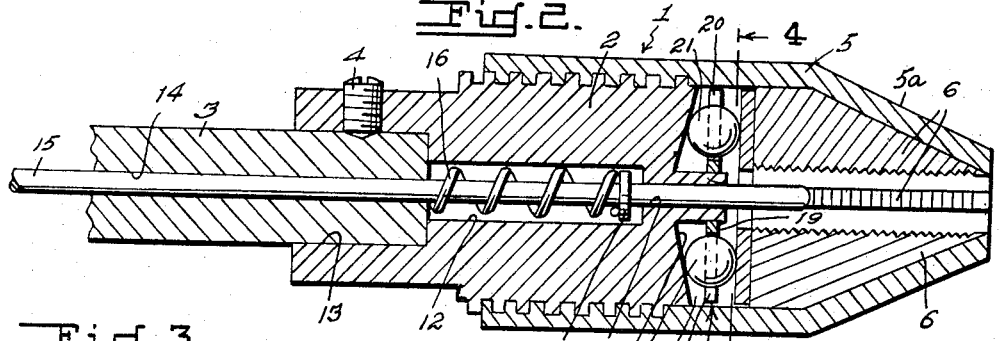
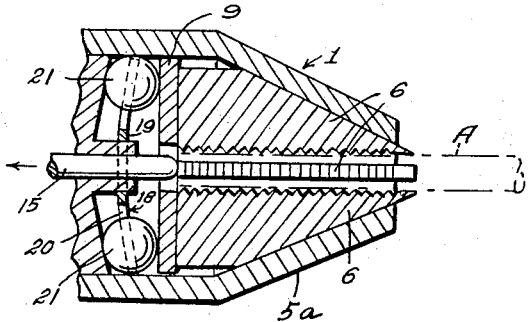 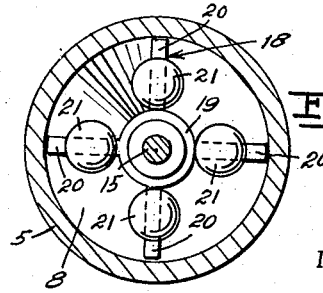
INVENTOR
Curtis L. Wilson
BY Harry M. Saragovitz,
Edward J. Kelly &
Herbert Berl
ATTORNEYS.

United States Patent Office 3,348,852
Patented Oct. 24, 1967

3,348,852
AUTOMATIC CHUCK
Curtis L. Wilson, Box 1094, Sierra Vista, Ariz. 85635
Filed Jan. 27, 1965, Ser. No. 428,587
5 Claims. (Cl. 279—58)

ABSTRACT OF THE DISCLOSURE

An automatic chuck having a body, a sheath around the body and a series of tool gripping jaws slidable in the sheath. Upon insertion of a tool in the jaws rotation of the chuck is initiated and a series of ball weights move radially outward upon centrifugal force to apply tension on the jaws.

---

The invention described herein may be manufactured and used by or for the Government for governmental purposes, without the payment to me of any royalty thereon.

This invention relates to an automatic chuck and more particularly to a tool chuck which automatically starts, grips and ejects a tool, bit or workpiece.

Briefly, the invention consists of a tool chuck, used in a lathe or the like. When the tool is inserted into the chuck it pushes a spring-loaded plunger to close a switch which, in turn, energizes a motor which rotates the chuck. Upon rotation of the chuck, the centrifugal force created thereby causes a series of ball weights to move radially outward to urge the jaws of the chuck to tightly grip the tool. Upon cessation of the chuck's rotation, the ball weights return towards the center of the chuck's axis and the tension is relieved and the jaws release the tool which is ejected from the chuck by the spring-biased plunger.

It is therefore a primary object of this invention to provide an automatic chuck that will be set in rotation by the insertion of a tool therein, and the tool being tightly gripped by the jaws of the chuck by means operated by centrifugal force.

It is another object to provide an automatically actuated chuck that will accommodate tools or bits of different sizes without manual adjustment of the chuck.

A further object is to provide an automatic tool chuck that may be safely operated without physical danger to the operator.

A still further object is to provide an automatic chuck which eliminates time delays, operator errors and expense caused thereby.

A final object of the invention is to provide a tool chuck that automatically ejects the tool upon cessation of its rotation.

The specific nature of the invention as well as other objects and advantages thereof, will clearly appear from a description of a preferred embodiment as shown in the accompanying drawing in which:

FIG. 1 is a schematic view of the automatic chuck and a wiring diagram of a motive means therefor;

FIG. 2 is a partial sectional view of the chuck taken along line 2—2 of FIG. 1;

FIG. 3 is a detail section of the forward portion of the chuck and showing the ball weights in their radially extended position with the chuck gripping the tool; and, FIG. 4 is a cross sectional view taken along line 4—4 of FIG. 2.

Referring to the drawing, reference character 1 denotes, generally, the automatic chuck of the invention.

The automatic chuck 1 is composed of the usual elements which include essentially a cylindrical body 2, a shaft 3 secured in body 2 by a set screw 4, a rotatable tubular sheath 5 threadably secured on body 2, having a conical nose portion 5a, and a series of sliding, serrated jaws 6.

Shaft 3 is usually driven by a motive power such as an electric motor M and a belt drive B.

Usually, in order to tighten or release the jaws 6, it was necessary to turn the sheath 5 for proper adjustment.

In the present invention, the forward portion of body 2 is modified to provide a chamber 7. The forward face of the body is milled out to form an inwardly beveled surface 8.

A washer 9 is disposed against jaws 6 for the purpose of sliding the jaws 6 simultaneously when the washer 9 is pushed against them.

Body 2 is further formed with a central boss 10 and the entire body is centrally bored as at 11 and counterbored as at 12 and 13, tthe bore 13 being adapted to receive the shaft 3 which is also centrally bored as at 14.

A plunger 15 is slidable in bores 11, 14 and counterbore 12.

Plunger 15 is encircled by a coil spring 16 in counterbore 12 and this spring biases between the inner end of shaft 3 and a stop 17 on plunger 15 and normally urges plunger 15 inwardly towards jaws 6.

A spider, generally indicated by 18, is provided with a hub 19. Spokes 20, integral with the hub 19, extend radially therefrom (four are shown). A ball weight 21 is slidable on each spoke 20 as shown.

The inner end of plunger 15 extends inwardly between jaws 6 for a purpose to be described later. The outer end of the plunger is in contact with a switch 22 (see FIG. 1). The switch 22 is in electric circuitry with a plug 23 for connection to an electric power source, by leads 24 and 25 and to an electric motor M or the like for driving shaft 3 by a belt B. A second switch 26 connected with lead 24 is provided for switching to a manual or electric start, this however, being optional.

If desired, a torque clutch 27 may be applied to shaft 3 for disengagement of the clutch 1. This being optional forms no part of this invention.

The electric circuit and motive means shown in FIG. 1 are shown by way of example only. Other switching and motive means may be used for operating the clutch if desired.

Operation

In operation, a workpiece A (see FIG. 3) is inserted into the jaws 6 and pushed inward against plunger 15 which closes switch 22 (switch 26 being turned to "auto start" and plug 23 being connected to an electrical energy source, such as an electrical outlet, etc.).

The motor M rotates shaft 3 by belt B. Chuck 1 and ball weights 21, due to the centrifugal force generated thereby, move outwardly on spokes 20, and, the beveled surface 8 causes washer 9 to urge all of the jaws 6 outwardly. Due to the conical nose portion 5a, jaws 6 also move inwardly and grip the workpiece, bit, or tool A. This action is almost instantaneous.

As long as the chuck 1 rotates, the workpiece A will be securely gripped by jaws 6, but when switch 26 is opened and chuck 1 ceases to rotate, spring 16 will urge plunger 15 outwardly to eject the workpiece A from jaws 6 since the ball weights will be returned to their inner position as seen in FIG. 2.

It is apparent that a highly useful automatic chuck has been devised since there is no adjustment of the chuck necessary which will enable the operator to handle the operation of the chuck without even touching the workpiece. The workpiece A may be inserted by tongs if desired when the workpiece has sharp edges. The automatic ejection of the workpiece is especially desirable since it is generally too hot to handle after use and the operator usually had to wait until it was cooled before removal.

The automatic chuck of this invention quickly adapts to workpieces of different diameters and eliminates time consuming adjustment of the jaws of the chuck to accommodate the workpieces of various diameters; hence elimination of operating errors.

Variations and modifications may be effected without departing from the scope of the novel concept of the present invention as set forth in the appended claims.

What is claimed is:

1. An automatic chuck comprising in combination, a body, a shaft secured to said body, a sheath secured around said body, a series of gripping jaws slidably mounted in said sheath, there being a chamber between said body and said jaws, means responsive to centrifugal force generated by rotation of said chuck in said chamber, said means adapted to apply tension on said jaws upon rotation of said chuck, means for rotating said chuck and means for automatically activating said rotation carried by said chuck.

2. An automatic chuck comprising in combination, a cylinder body having an inwardly beveled forward face, a tubular sheath having a conical forward portion detachably secured around said body, a drive shaft centrally secured to the rearward end of said body, a series of gripping jaws slidable in said beveled portion of said sheath, there being an annular space between said beveled face of said body and the inner ends of said jaws, means responsive to centrifugal force generated by rotation of said chuck and centrally carried by the forward end of said body, said means adapted to apply tension on said jaws by influence of said beveled surface and rotation of said chuck, means for rotating said shaft and said chuck and means carried by said shaft and said chuck to initiate rotation thereof.

3. An automatic chuck as set forth in claim 2 wherein said means for applying tension on said jaws upon centrifugal force generated by rotation of said chuck comprises a series of ball weights nested in said annual space, said balls adapted to move radially outward, upon rotation of said chuck, and to be moved progressively forward by said beveled face and push said jaws forward whereby said jaws will move also inwardly due to said conical forward portion of said sheath.

4. An automatic chuck as set forth in claim 2 wherein said means for initiating rotation of said chuck comprises a spring biased plunger slidable axially in said shaft and said body, the forward end of said plunger extending a distance between said jaws, said plunger to be moved rearwardly by insertion of a workpiece into said jaws to initiate operation of said means for rotating said chuck.

5. An automatic chuck having an axial line of symmetry and comprising in combination, a body, a shaft secured in the rearward end of said body, a sheath secured around said body, a series of gripping jaws slidably mounted in said sheath forwardly of said body, means carried by said chuck responsive to rotation of said chuck for actuating said gripping jaws, there being an axial bore through said shaft and said body and a counter bore located in said body, a plunger slidable in said axial bore and counterbore, a coil spring encircling said plunger in said counterbore and normally urging said plunger between said jaws, an electric motor in driving connection with said shaft and an electric switch in circuitry with said motor and a source of power, said switch being operable by said plunger whereby when said plunger is pushed rearwardly by the insertion of a tool between said jaws, said switch will close to energize said motor and rotate said chuck.

References Cited

UNITED STATES PATENTS

| 2,367,863 | 1/1945 | Grey | 279—50 |
| 2,495,050 | 1/1950 | Barker | 279—51 |

ROBERT C. RIORDON, *Primary Examiner.*